United States Patent Office 2,763,113
Patented Sept. 18, 1956

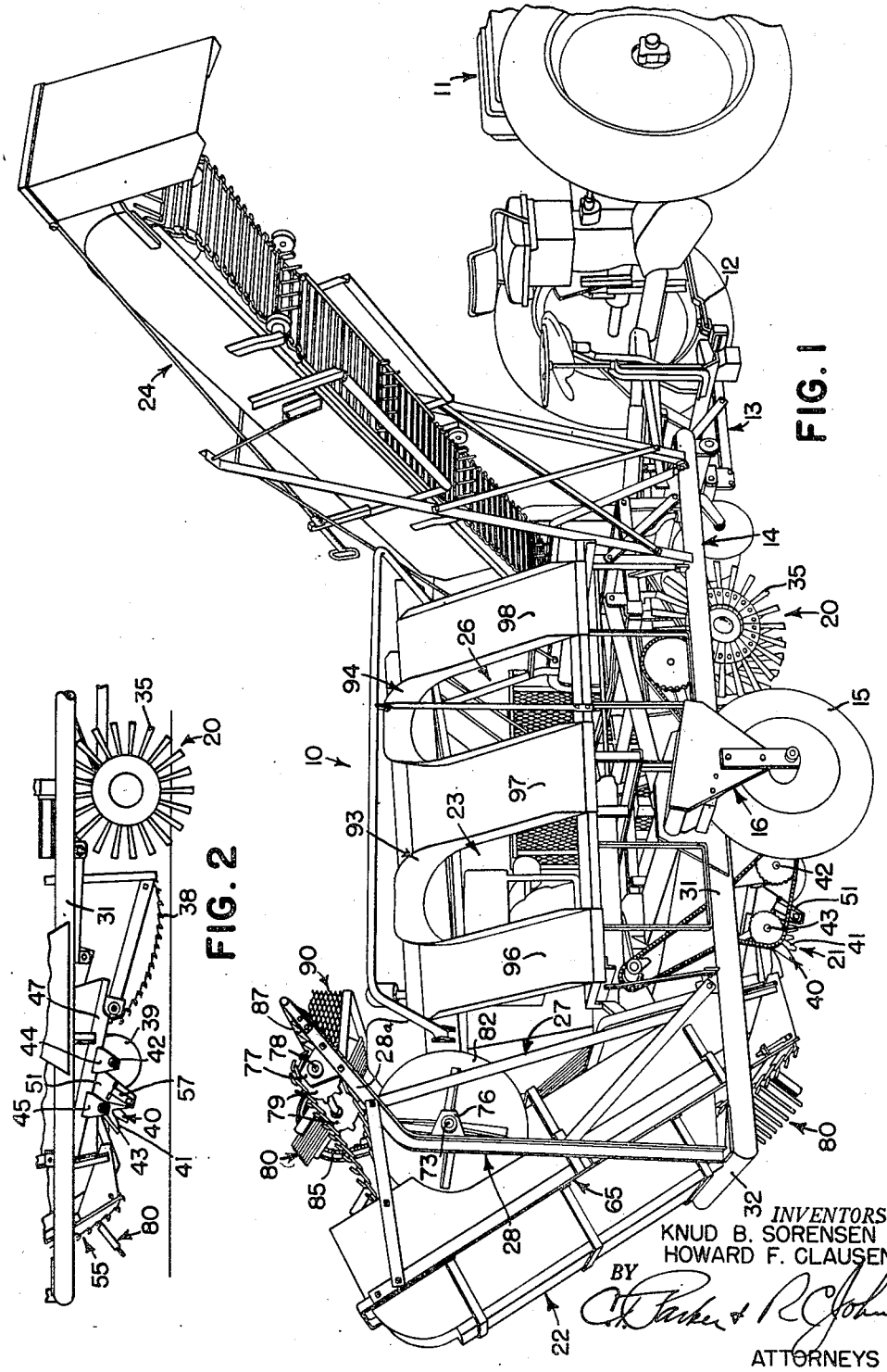

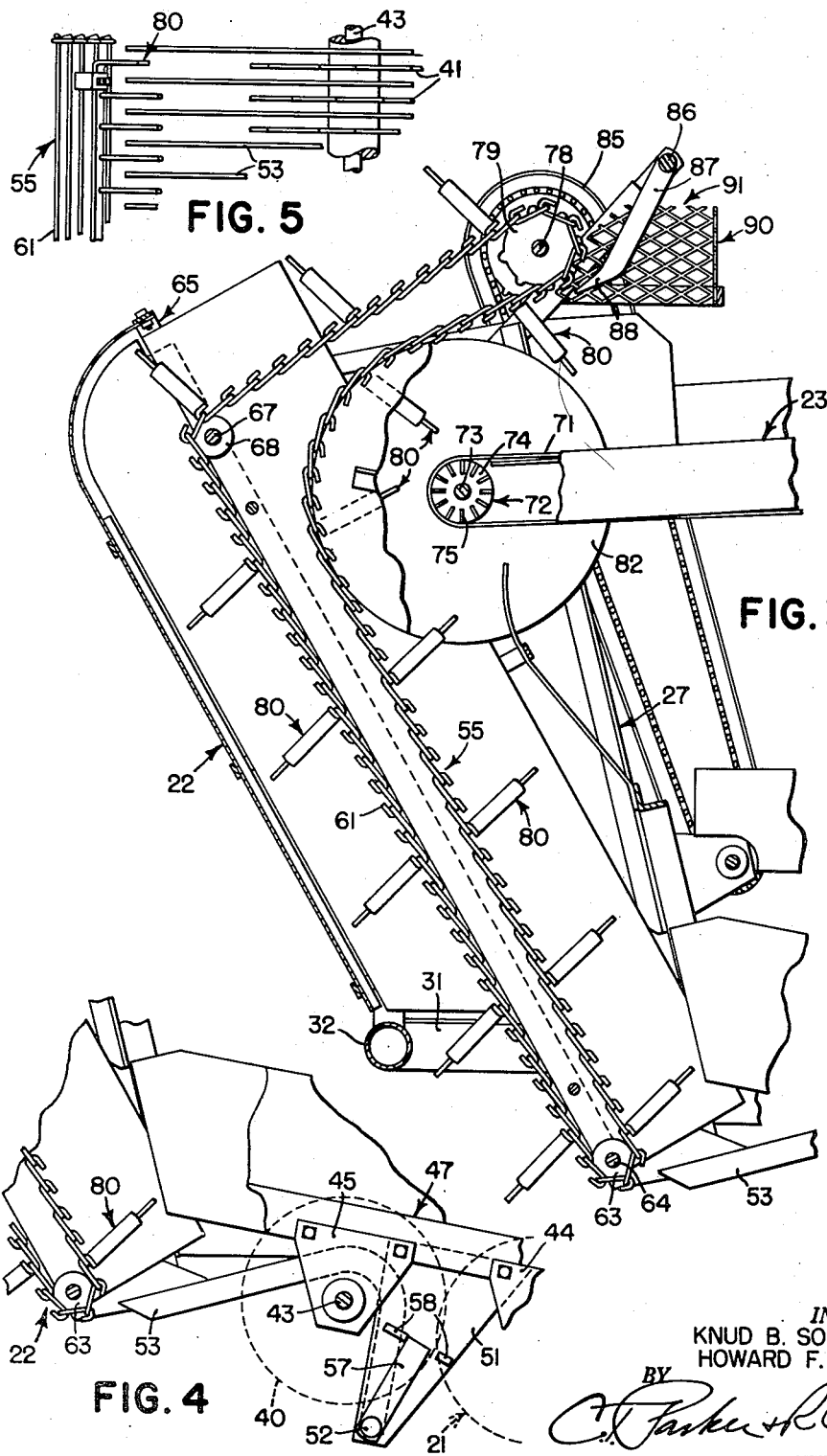

2,763,113

BEET HARVESTER

Knud B. Sorensen, Rock Island, and Howard F. Clausen, Moline, Ill., assignors to Deere & Company, Moline, Ill., a corporation of Illinois Application April 12, 1952, Serial No. 281,954

5 Claims. (Cl. 55—134)

The present invention relates generally to agricultural implements and more particularly to beet harvesters.

The object and general nature of the present invention is the provision of a beet harvester of particularly sturdy and compact construction. Particularly, it is a feature of this invention to provide a beet harvester having a main frame with lower beet-digging means and an upper forwardly moving sorting belt, with new and improved elevator means for transferring the beets from the beet-digging means upwardly and forwardly over and onto the rear end of the forwardly moving sorting belt. By virtue of this construction, the over-all length of the harvester is substantially reduced, as compared with other machines for the same purpose. More specifically, it is a feature of this invention to provide new and improved stripping means cooperating with the elevator mechanism just referred to whereby beets, stones and the like that might become caught in the lower run of the elevator do not clog or jam the machine.

These and other objects and advantages of this invention will be apparent to those skilled in the art after a consideration of the following detailed description of the preferred embodiment illustrated in the accompanying drawings, in which:

Figure 1 is a perspective view of a beet harvester in which the principles of the present invention have been incorporated.

Figure 2 is a fragmentary side view drawn on a reduced scale showing one way of delivering beets from the beet-digging wheels rearwardly to the lower end of the rear elevator.

Figure 3 is an enlarged fragmentary elevational view, with parts broken away and shown in section, showing in particular the details of the rear elevator at an enlarged scale.

Figure 4 is an enlarged fragmentary elevational view of the stripper bars associated with the lower end of the elevator shown in Figure 3.

Figure 5 is an enlarged fragmentary plan view showing how the teeth of the elevator flights cooperate with the pivotally mounted stripper bars carried at the rear end of the main frame adjacent the lower end of the elevator.

Referring now first to Figure 1, the beet harvester, which is indicated in its entirety by the reference numeral 10, is shown as a two-wheel supported cart-like structure propelled by and supported at its front end on a farm tractor 11. The latter is generally of conventional construction and embodies a drawbar 12 to which the front end of the harvester is connected, as by a hitch structure 13 that is rigidly connected with the front end section of a unitary main frame 14 of the beet harvester. The supporting wheels of the harvester are indicated at 15 and each is carried in a wheel frame and spindle assembly 16 that is arranged to be adjustable laterally relative to the main frame 14. The supporting wheels 15 are arranged generally midway between the front and rear end sections of the harvester frame 14.

The beet harvester 10 preferably is constructed and arranged as a two-row machine and includes a beet-digging unit 20, a conveyor and cleaning unit indicated generally at 21, a rear elevator unit 22 that delivers the beets onto a forwardly moving sorting conveyor, here in the form of a belt 23 that is mounted on an upper portion of the main frame, and a truck loading elevator unit 24 that receives the beets from the sorting belt and delivers them laterally outwardly and upwardly to a point of discharge from which the beets drop into a truck, trailer or the like driven alongside the harvester in operation. The beet-digging unit or means 20 is carried by the lower portion of the frame 14. In operation, the elevator unit 22 moves upwardly at the rear end of the frame and delivers beets onto the rear end of the sorting belt 23, and, above the main frame, the sorting table moves forwardly toward the forwardly mounted truck elevator 24. This provides a very compact harvester. The main frame 14 includes various braces and other supporting superstructure which will be referred to generally as the upper portion of the main frame 14 and indicated generally at 26, 27 and 28, by which the sorting belt 23 and other parts of the harvester are supported.

The present invention is particularly concerned with the rear elevator structure 22 and associated parts and a detailed description of the same appears below.

Referring first to Figures 1, 2 and 3, the main frame 14 comprises, beside the front end section and upper portion previously mentioned, a rear end section 32 and a lower portion here indicated by the tubular members 31. These sections and portions are suitably secured together, as by welding, to form a unitary rigid frame. The beet-digging unit includes a plurality of pairs of beet-digging wheels 35 carried at the lower portion 31 of the front end section of the frame 14 and, as best seen in Figure 2, the beets raised by the wheels 35 are delivered onto a lower generally horizontally disposed first elevator 38, from which the beets are discharged onto two sets of cleaning rolls indicated at 39 and 40, respectively. Each of these cleaning units 39 and 40 comprises a plurality of star-like wheels 41 fixed to shafts 42 and 43, respectively, and driven by any suitable means. The first elevator 38 and the cleaning rolls or wheels are conventional so far as the present invention is concerned and in combination serve as lower conveying means extending longitudinally and rearwardly for moving beets from the digging unit to the rear elevator unit 22. The cleaning wheel shafts 42 and 43 are supported by bearing means carried in brackets 44 and 45 that are supported in any suitable way from the main frame of the harvester, such as by a cleaning wheel sub-frame 47 (Figure 4).

The generally vertical beet elevator structure or means 22, carried at the rear end section 32 of the main frame 14 and with which the present invention is more particularly concerned, receives beets from the cleaning wheels 41 that form the principal portion of the cleaning unit 21 and discharges them onto the receiving end of the sorting belt 23. To this end, a pair of brackets 51 are fixed to the side bars of the sub-frame 47 and depend therefrom. The lower ends of the brackets are apertured to rockably receive a shaft 52 to which the lower forward portions of a plurality of stripper bars 53 are fixed in laterally spaced apart relation. As best shown in Figure 4, each of the stripper bars 53 is curved, so as to clear the star wheel shaft 43, and lies between adjacent wheels 41. The rear portions of the stripper bars extend rearwardly in cooperating relation with the endless elevator elements, indicated in its entirety by the reference numeral 55, to which detailed reference will be made below.

Fixed to each end of the stripper bar shaft 52 is an arm 57 which lies outside the associated bracket 51 and cooperates with a pair of lugs 58 that are fixed, as by welding, to the associated bracket 51 and serves as means cooperating with the arm 57 for limiting the rocking movement of the shaft 52. As shown in Figure 4, the stripper bars normally extend downwardly and rearwardly at their rear ends, with the arms 57 lying against the rear lugs 58. However, if the elevator chain 55 should pick up a rock, beet, or other object as the beet-engaging flights 80 thereof approach the stripper bars 53 from below, the stripper bars may swing upwardly an amount, as determined by the lugs 58, sufficient to permit the object to pass the stripper bars 53.

The elevator element 55 preferably includes an endless chain 61 comprising interconnected links, being of the type commonly referred to as a potato chain, inasmuch as this type of elevator or conveyor is in common use in potato diggers and the like. At the lower portion of the elevator unit 22, the chain 61 passes over a pair of chain-supporting rollers 63 journaled for rotation on a shaft 64 which is fixed to the lower portion of a frame 65 of the elevator unit 22. The upper portion of the rear elevator frame 65 carries another shaft 67 upon which a second pair of chain-supporting rollers 68 are mounted.

Referring for the moment to the sorting belt 23, this unit includes an endless belt member 71, preferably of rubber or rubber-like material mounted in the upper portion of the main frame of the harvester and supported at the rear end of the main frame on a roller member 72. The roller member 72 includes a transverse rotatable part or shaft 73 on which a plurality of disks 74 are fixed, the disks being slotted to receive a plurality of radially arranged bars 75 forming a belt-supporting member. The sorting belt roller shaft 73 is supported at its ends by bearings in a pair of brackets 76 carried in any suitable way by the vertical frame structure 28 mentioned above. As best shown in Figure 1, the framework 28 includes a forwardly and upwardly extending section 28a on which a pair of brackets 77 are fixed. These brackets support a roller shaft 78 to which sprockets 79 are fixed. The sprockets 79 receive the upward forward portion of the elevator chain 61.

It will be noted that the shaft 78 lies above and forward of the sorting belt roller shaft 73 while the rear upper elevator shaft 67 lies substantially directly to the rear of the sorting belt roller member 72. By virtue of this construction, the forward upwardly moving run or reach of the elevator element 55, upon which a plurality of fingered flights 80 are fixed, moves upwardly from the stripper bars 53 and then upwardly and forwardly around the rear roller member 72 of the sorting belt unit 23. To guide the elevator chain in this movement, a pair of disks 82 are mounted on the end portions of the sorting belt shaft 73 so as to guide the upwardly and forwardly moving section or reach of the elevator chain as it passes around the rear end of the sorting belt 71 and approaches the sprockets 79. The latter, and the shaft 78 upon which they are mounted, are driven in and suitable way, as by sprocket and chain means 85 (Figure 1). The flights 80, as the chain passes over the guide wheels 82, clear the rear end of the sorting belt but move sufficiently close thereto so that, as the flights 80 pass around the rear end of the sorting belt, beets are deposited onto the sorting belt and, at the same time, are prevented from falling off the rear end of the sorting belt between the latter and the upwardly and forwardly moving flights. After dumping the beets onto the rear end of the sorting belt 23, the flights pass around the sprockets 79, next downwardly and rearwardly around the rollers 68, and then downwardly and forwardly to the lower rollers 63, as will be best understood from Figure 3. The upper bar 86 at the upper end of the frame extension 28a carries stripper bars 87 which extend downwardly and rearwardly and are arranged so that the teeth of the flights 80 pass between the stripper bars 87. The latter have curved ends 88 lying close to the elevator chain 61, for removing any small beets or the like, that may tend to be carried over by the conveyor flights. A hood 90 is supported by the upwardly forwardly extending portion 28a of the framework 28 and is open at its upper end, as at 91, to provide for the escape of small beets from the front end of the elevator, thereby serving to prevent their becoming jammed at this point. Also, the hood serves to prevent the attendant or or attendants from getting their hands or fingers caught between the fingers of the elevator and the stationary bars 86.

The sorting belt 71 is driven by any suitable means, the upper run or reach moving forwardly and carrying the beets from the rear receiving end to the front discharge end of the sorting belt and past a pair of stations 93 and 94 at which one or two operators may stand for the purpose of removing any clods and other material from the mass of beets moved forwardly by the sorting belt 71. In this manner the sorting belt serves as a sorting table as well as a conveying means. At the front or discharge end the sorting belt deposits the cleaned and sorted beets into the lower end of the truck elevator 24 that is carried at the front end of the machine, as shown in Figure 1. The truck elevator 24 also serves as collecting means for receiving beets leaving the sorting or conveyor belt.

By virtue of having the rear elevator supported so as to include a forwardly extending portion overhanging or overlying the rear end of the sorting belt, the beets are deposited in a simple and direct manner onto the sorting belt without requiring hoppers, cross conveyors or the like. Also, by moving the beets substantially directly upwardly from the beet-digging and cleaning means onto a forwardly moving sorting belt carried at the upper part of the main frame, the machine is compact and sturdy and permits the installation of a truck elevator, as shown at 24, at the forward end of the harvester, whereby the over-all length of the beet harvester is reduced and the operation of driving a truck alongside the harvester in a position to receive beets from the truck elevator 24 is materially facilitated. Chutes 96, 97 and 98 are provided alongside the sorter stations 93 and 94, the upper portions of the chutes being disposed substantially flush with the upper run or reach of the sorting belt 71, whereby all that the sorters have to do, so far as removing clods and the like is concerned, is to slide the clods and other material off the sorting belt and into the chutes 96—98, it not being necessary to grasp and lift the clods.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A beet harvester comprising the combination of a main frame extending in a generally fore-and-aft direction and having front and rear end sections and upper and lower portions at and between said front and rear end sections, generally centrally disposed ground wheels connected with the lower portion of said main frame, beet-digging means carried adjacent the lower portion of the front end section of the main frame, forwardly of said ground wheels, a sorting belt carried at the upper portion of said main frame and movable forwardly from the rear end section of the main frame to a point adjacent the forward end section of the main frame, beet-elevator means carried at the rear end section of the main frame and extending generally vertically from the lower portion to the upper portion of the main frame, lower beet-conveying means extending along the lower portion of said main frame from said beet-digging means to the lower portion of said beet-elevator means and extending generally between said ground wheels, said beet-elevator means including an upwardly and forwardly disposed elevator section overlying the rear portion of the sorting belt to convey beets from a position at the rear of the main frame to a position above and forwardly of the rear portion of the sorting belt, and beet-collecting means carried by the main frame adjacent the front end section thereof for receiving beets from the sorting belt.

2. A beet harvester as defined in claim 1, further characterized by said beet-collecting means comprising a generally upwardly and laterally extending elevator for conveying beets from the discharge portion of said sorting belt into a truck or the like driven alongside the front end portion of said main frame.

3. For use in a beet harvester having a unitary main frame provided with front and rear end sections and upper and lower portions and beet-digging means carried at the lower portion of the front end section of the main frame, a sorting belt carried at the upper portion of the main frame and movable forwardly from the rear end section of the main frame, beet-elevator means carrier at the rear end section of the main frame for discharging beets dug by said digging means onto said sorting belt including therein an upwardly and forwardly disposed elevator section overlying the sorting belt and for conveying beets from a position at the rear of the sorting belt to a position above the sorting belt, means extending longitudinally and rearwardly for conveying beets from said digging means to said beet-elevator means, and beet-collecting means carried by the main frame adjacent said front end section of the main frame for receiving beets from the sorting belt.

4. For use in a beet harvester having a unitary main frame provided with front and rear end sections and upper and lower portions and beet-digging means carried at the lower portion of the front end section of the main frame, lower conveying means carried by the main frame along the lower portion thereof and extending longitudinally for receiving beets from said digging means and conveying them rearwardly, a sorting belt carried by the upper portion of the main frame and including an upper run movable forwardly along the main frame from the rear end section toward the front end section, a beet-conveying elevator carried at the rear end section of the main frame and extending from the lower portion to the upper portion of the main frame and located so as to receive beets from said lower conveying means and delivering them onto the forwardly movable upper run of said sorting belt at a point proximate to said rear end section of the main frame, and a loading elevator carried at the front end section of the main frame in a position to receive beets from said upper run of the sorting belt.

5. For use in a beet harvester having a main frame provided with front and rear ends, generally vertical elevator means at the rear end of the main frame and including an endless element made up of a plurality of transverse links, certain of said links having a plurality of outwardly extending fingers forming toothed beet-engaging flights, each of which is freely swingable toward or away from the adjacent flights by virtue of the flexing of said endless element, means supporting said endless element comprising a lower roller carried by said frame generally below the rear end of the latter, and a pair of rollers carried by the rear end of said frame above said lower roller, the rollers of said pair being spaced so that a portion of said endless element extends forwardly and above the rear end of said main frame, one of said upper rollers having substantially imperforate disks, one carried by each end portion of said one roller, said disks being of such diameter that, when said endless elevator element passes around said disks, the outer ends of the associated flights move to positions in which the outer ends approach close to each other and close to the axis of rotation of said one upper roller, and a generally horizontal, fore-and-aft extending, movable endless beet-receiving belt supported at its rear end on said one upper roller and driven thereby.

References Cited in the file of this patent

UNITED STATES PATENTS

| | | |
|---|---|---|
| 732,499 | Austin | June 30, 1903 |
| 1,351,948 | Fowler | Sept. 7, 1920 |
| 1,487,821 | Stoltenberg | Mar. 25, 1924 |
| 1,855,549 | Gookin | Apr. 26, 1932 |
| 2,013,215 | Langenberg | Sept. 3, 1935 |
| 2,080,336 | Powell | May 11, 1937 |
| 2,379,198 | Templeton | June 26, 1945 |
| 2,599,475 | Orendorff | June 3, 1952 |